United States Patent
Huang et al.

(10) Patent No.: US 11,327,883 B2
(45) Date of Patent: May 10, 2022

(54) SOLID-STATE DRIVE PERFORMANCE AND LIFESPAN BASED ON DATA AFFINITY

(71) Applicant: INTERNATIONAL BUSINESS MACHINES CORPORATION, Armonk, NY (US)

(72) Inventors: Zhi Zhi Huang, Shanghai (CN); Yongjie Gong, Shanghai (CN); Xu Chu Jiang, Shanghai (CN); Yao Dong Zhang, Shanghai (CN); Ning Ding, Shanghai (CN); Zhen Nyu Yao, Shanghai (CN); Jing Lan Chen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/816,313

(22) Filed: Mar. 12, 2020

(65) Prior Publication Data
US 2021/0286717 A1    Sep. 16, 2021

(51) Int. Cl.
G06F 12/02    (2006.01)
G06N 3/02    (2006.01)

(52) U.S. Cl.
CPC ...... *G06F 12/0246* (2013.01); *G06F 12/0253* (2013.01); *G06N 3/02* (2013.01);
(Continued)

(58) Field of Classification Search
None
See application file for complete search history.

(56) References Cited

U.S. PATENT DOCUMENTS

2012/0239857 A1* 9/2012 Jibbe .................. G06F 12/0246
                                                               711/103
2013/0151482 A1* 6/2013 Tofano ................ G06F 3/0641
                                                               707/692
(Continued)

FOREIGN PATENT DOCUMENTS

CN    102542361 A    7/2012
CN    103455435 A    12/2013
CN    104391661 A    3/2015

OTHER PUBLICATIONS

IO Pattern based Optimization in SSD L Xiangfeng—Flash Memory Summit, 2016—flashmemorysummit.com (Year: 2016).*

(Continued)

*Primary Examiner* — Jared I Rutz
*Assistant Examiner* — Marwan Ayash
(74) *Attorney, Agent, or Firm* — Dmitry Paskalov

(57) ABSTRACT

The example embodiments disclose a system and method, a computer program product, and a computer system for improving solid-state drive performance. The example embodiments may include generating, by an affinity adapter located external to the solid-state drive, a plurality of affinities for each of a plurality of data to a respective plurality of subdivisions of data of a solid-state drive, wherein each of the plurality of data is associated with a logical block address (LBA) and each of the respective plurality of subdivisions has a physical block address (PBA). The example embodiments may also include receiving a request to write first data having a first LBA to the solid-state drive, determining by the solid-state drive, at a first time, that the first data has an affinity with a particular subdivision of data of a solid-state drive based on the generated plurality of affinities, and writing the first data to a memory location of
(Continued)

the solid-state drive, wherein the PBA of the memory location has the determined affinity.

20 Claims, 12 Drawing Sheets

(52) U.S. Cl.
CPC ............... *G06F 2212/1016* (2013.01); *G06F 2212/7201* (2013.01); *G06F 2212/7205* (2013.01)

(56) References Cited

U.S. PATENT DOCUMENTS

| | | | |
|---|---|---|---|
| 2014/0365449 A1* | 12/2014 | Chambliss | G06F 16/1752 707/692 |
| 2017/0075832 A1 | 3/2017 | Bhimani | |
| 2017/0109096 A1 | 4/2017 | Jean | |
| 2017/0228157 A1 | 8/2017 | Yang | |
| 2017/0228457 A1 | 8/2017 | Billawal | |
| 2019/0332527 A1* | 10/2019 | Ponnuru | G06F 12/0804 |
| 2020/0272566 A1* | 8/2020 | Saeki | G06N 3/08 |

OTHER PUBLICATIONS

Mell et al., "The NIST Definition of Cloud Computing", National Institute of Standards and Technology, Special Publication 800-145, Sep. 2011, pp. 1-7.

Min et al., "SFS: Random Write Considered Harmful in Solid State Drives", https://scinapse.io/papers/162515996, Published on Feb. 14, 2012, pp. 1-18.

Qiu et al., "NVMFS: A Hybrid File System for Improving Random Write in NAND-flash SSD", 2013 IEEE 29th Symposium on Mass Storage Systems and Technologies (MSST) Publisher: IEEE, http://cesg.tamu.edu/wp-content/uploads/2012/02/MSST13.pdf, pp. 1-5.

Yong et al., "vStream: Virtual Stream Management for Multi-streamed SSDs", https://www.usenix.org/system/files/conference/hotstorage18/hotstorage18-paper-yong.pdf, printed Mar. 3, 2020, pp. 1-8.

* cited by examiner

SOLID-STATE DRIVE PERFORMANCE AND LIFESPAN BASED ON DATA AFFINITY

BACKGROUND

The example embodiments relate generally to improving solid-state drive performance and lifespan, and more particularly to improving solid-state drive performance and lifespan based on data affinity.

In many solid-state drives (SSDs), mapping between logical block addresses (LB As) and physical block addresses (PB As) changes for each write request. Associated LBA write requests are not located in continuous PBAs. Data of the same affinity are not grouped together, but rather located randomly across divisions of an SSD's memory.

SUMMARY

The example embodiments disclose a system and method, a computer program product, and a computer system for improving solid-state drive performance. The example embodiments may include generating, by an affinity adapter located external to the solid-state drive, a plurality of affinities for each of a plurality of data to a respective plurality of subdivisions of data of a solid-state drive, wherein each of the plurality of data is associated with a logical block address (LB A) and each of the respective plurality of subdivisions has a physical block address (PBA). The example embodiments may also include receiving a request to write first data having a first LBA to the solid-state drive, determining by the solid-state drive, at a first time, that the first data has an affinity with a particular subdivision of data of a solid-state drive based on the generated plurality of affinities, and writing the first data to a memory location of the solid-state drive, wherein the PBA of the memory location has the determined affinity.

BRIEF DESCRIPTION OF THE SEVERAL VIEWS OF THE DRAWINGS

The following detailed description, given by way of example and not intended to limit the example embodiments solely thereto, will best be appreciated in conjunction with the accompanying drawings, in which.

The drawings are not necessarily to scale. The drawings are merely schematic representations, not intended to portray specific parameters of the example embodiments. The drawings are intended to depict only typical example embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The example embodiments are only illustrative and may, however, be embodied in many different forms and should not be construed as limited to the example embodiments set forth herein. Rather, these example embodiments are provided so that this disclosure will be thorough and complete, and will fully convey the scope to be covered by the example embodiments to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the example embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various example embodiments.

In many solid-state drives (SSDs), mapping between logical block addresses (LBAs) and physical block addresses (PBAs) changes for each write request. Associated LBA write requests are not located in continuous PBAs. Data of the same affinity are not grouped together, but rather located randomly across divisions of an SSD's memory.

Figure 3:
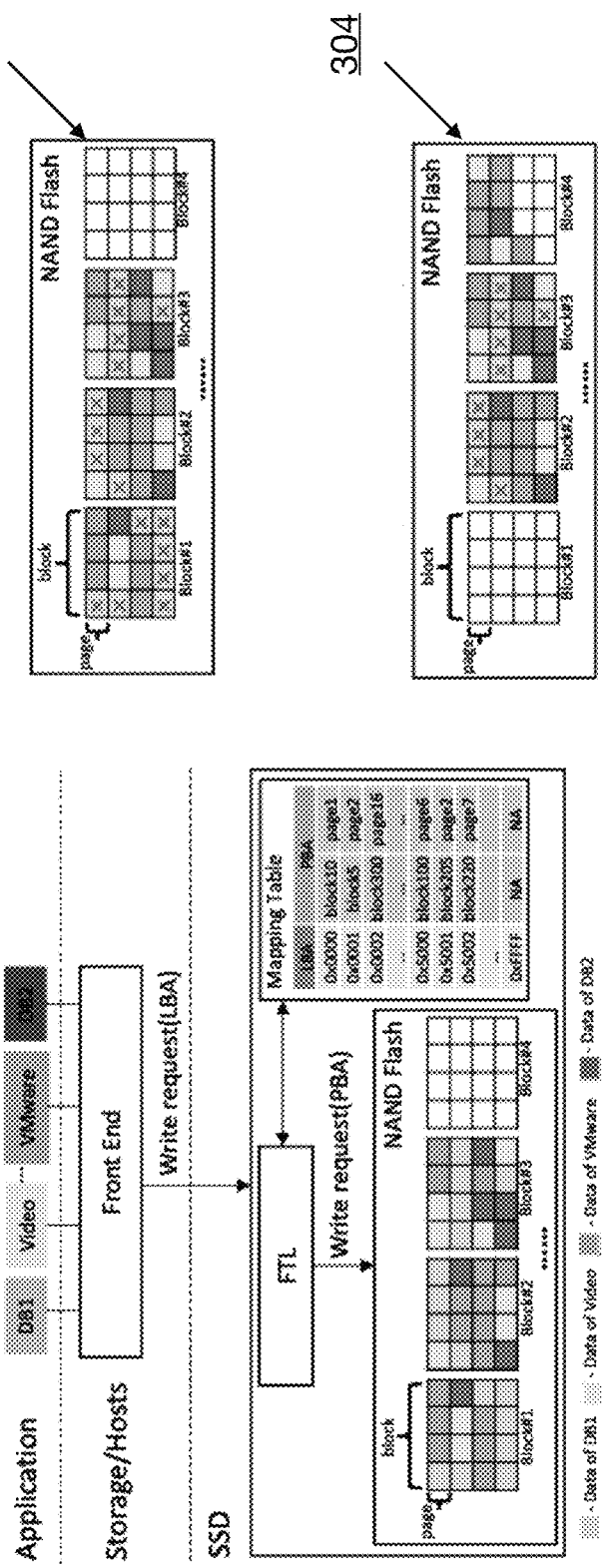
FIG. 3 depicts an illustrative example of an SSD garbage collection practice, in accordance with the example embodiments.

This common configuration may result in garbage collection requiring a large workload as well as a high erase count and valid page movement as shown in FIG. 3, which negatively affects SSD performance and lifespan.

Hence, an independent system is needed to address the aforementioned problem. Example embodiments of the present invention disclose a method, computer program product, and computer system that may improve SSD performance and lifespan based on data affinity. Accordingly, example embodiments are directed to a system that will analyze data affinity and write LBA data of the same affinity to continuous PBA. In embodiments, past LBA write requests, past affinity decisions, and/or one or more correlation algorithms may be used to analyze data affinity. Use cases of embodiments described herein may relate to the improvement of, for example, but not limited to, the process of writing data to an SSD and the process of SSD garbage collection. In general, it will be appreciated that embodiments described herein may relate to improving SSD performance across all SSD functions.

Figure 1A:
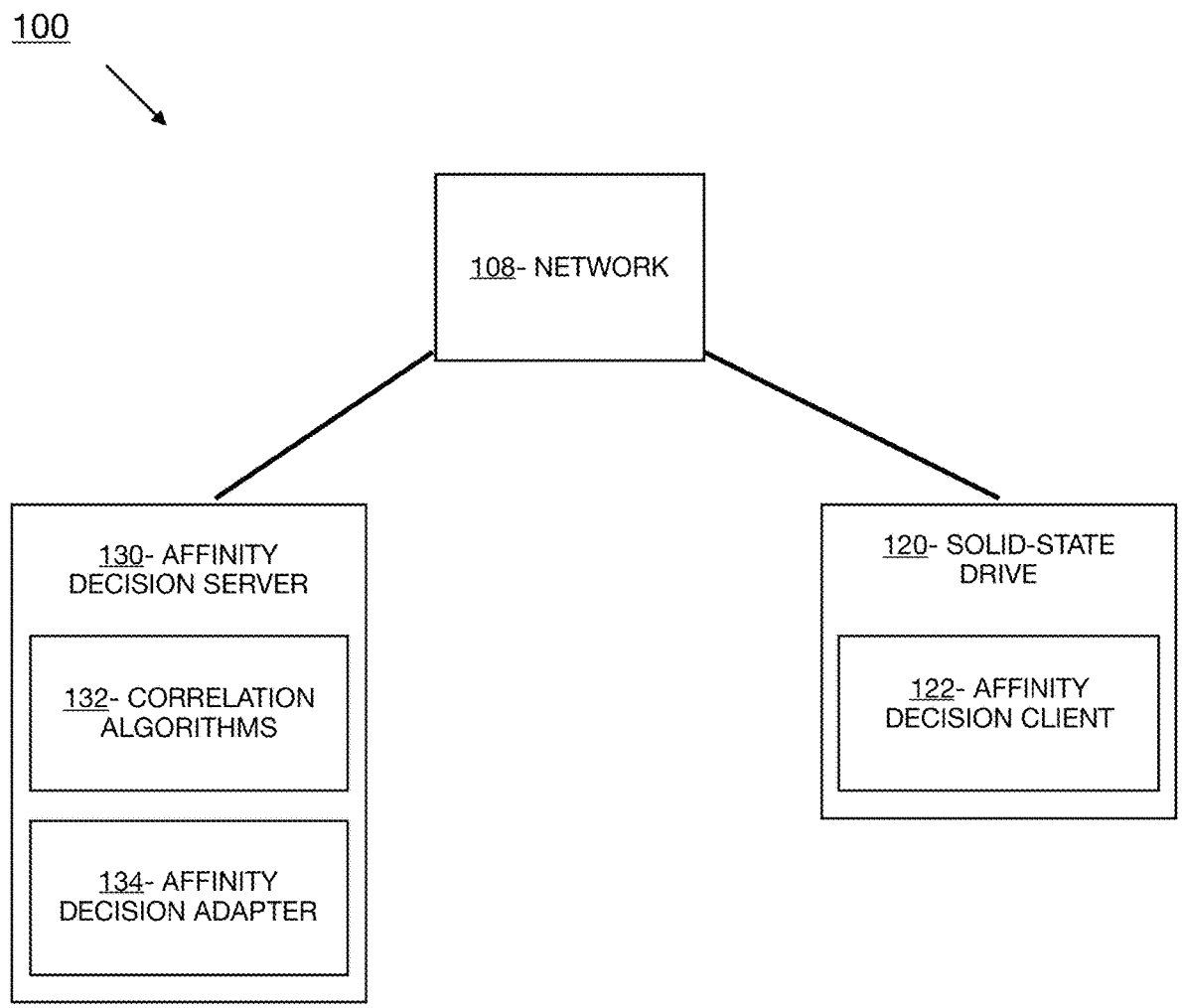
FIG. 1A depicts an example schematic diagram of an affinity adapter system, in accordance with the example embodiments.

FIG. 1A depicts the affinity adapter system 100, in accordance with the example embodiments. According to the example embodiments, the affinity adapter system 100 may include a solid-state drive 120 and an affinity decision server 130, which may be interconnected via a network 108. While programming and data of the example embodiments may be stored and accessed remotely across several servers via the network 108, programming and data of the example embodiments may alternatively or additionally be stored locally on as few as one physical computing device or amongst other computing devices than those depicted.

In the example embodiments, the network 108 may be a communication channel capable of transferring data between connected devices. Accordingly, the components of the affinity adapter system 100 may represent network components or network devices interconnected via the network 108. In the example embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the solid-state drive 120 includes an affinity decision client 122, and may have one or more functions of an enterprise server, laptop computer, notebook, tablet computer, netbook computer, personal computer (PC), desktop computer, server, personal digital assistant (PDA), rotary phone, touchtone phone, smart phone, mobile phone, virtual device, thin client, IoT device, or any other electronic device or computing system capable of receiving and sending data to and from other computing devices. In embodiments, the solid-state drive 120 may be comprised of a cluster or plurality of computing devices, in a modular manner, etc., working together or working independently. The solid-state drive 120 is described in greater detail as a hardware implementation with reference to FIG. 7, as part of a cloud implementation with reference to FIG. 8, and/or as utilizing functional abstraction layers for processing with reference to FIG. 9.

The affinity decision client 122 may act as a client in a client-server relationship, and may be a software and/or hardware application capable of communicating with and providing a user interface for a user to interact with a server via the network 108. Moreover, in the example embodiment, the affinity decision client 122 may be capable of transferring data from the solid-state drive 120 to other devices via the network 108. In embodiments, the affinity decision client 122 utilizes various wired and wireless connection protocols for data transmission and exchange, including Bluetooth, 2.4 gHz and 5 gHz internet, near-field communication, Z-Wave, Zigbee, etc. The affinity decision client 122 is described in greater detail with respect to FIG. 2A-2B.

In the example embodiments, the affinity decision server 130 may include one or more correlation algorithms 132 and an affinity decision adapter 134, and may act as a server in a client-server relationship with the affinity decision client 122. The affinity decision server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the affinity decision server 130 is shown as a single device, in other embodiments, the affinity decision server 130 may be comprised of a cluster or plurality of computing devices, working together or working independently. The affinity decision server 130 is described in greater detail as a hardware implementation with reference to FIG. 7, as part of a cloud implementation with reference to FIG. 8, and/or as utilizing functional abstraction layers for processing with reference to FIG. 9.

The correlation algorithms 132 may be one or more algorithms and or units of training data modelling a correlation between one or more units of data with the data's affinity. In the example embodiment, the correlation algorithms 132 may be generated using machine learning methods, such as neural networks, deep learning, hierarchical learning, Gaussian Mixture modelling, Hidden Markov modelling, and K-Means, K-Medoids, or Fuzzy C-Means learning, etc. The correlation algorithms 132 may use one or more methods as described with reference to FIG. 2A to determine the affinity of one or more units of data. Moreover, in embodiments, the correlation algorithms 132 may utilize two or more methods and weight the methods through use of a model, such as one generated through machine learning techniques, to determine the affinity of one or more units of data. The correlation algorithms 132 are described in greater detail with reference to FIGS. 2A and 4.

In the example embodiments, the affinity decision adapter 134 may be a software and/or hardware program capable of receiving a configuration and past LBA write requests. The affinity decision adapter 134 may be capable of applying one or more correlation algorithms to determine the affinity of data. The affinity decision adapter 134 may be further capable of synchronizing (syncing) 174 the affinity of data to the meta-data area of an SSD 120. Moreover, the affinity decision adapter 134 may be capable of analyzing SSD cache and garbage collection valid page tables 174 for same affinities, and writing LBA data to continuous PBA. The affinity decision adapter 134 is described in greater detail with reference to FIG. 2A-2B.

Figure 1B:
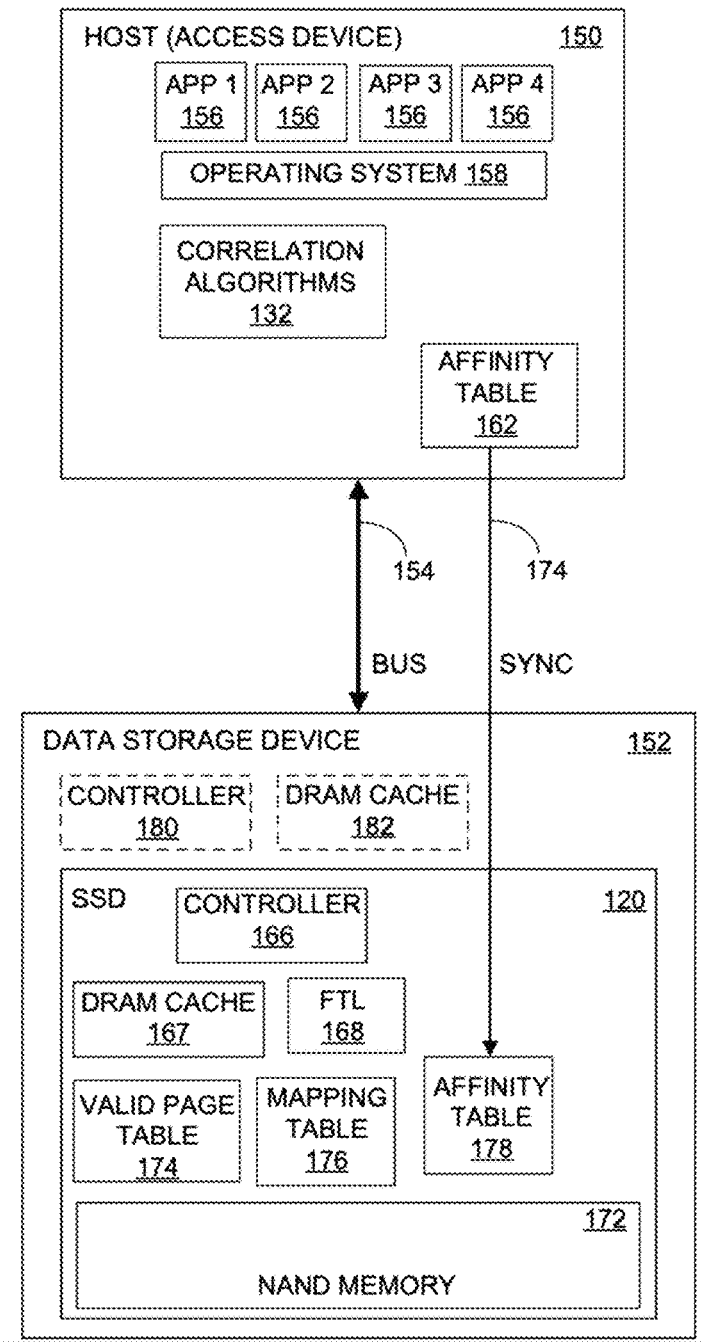
FIG. 1B depicts an example schematic diagram of an affinity adapter system wherein one or more correlation algorithms and an affinity table are located in a host (access device), in accordance with the example embodiments.

FIG. 1B depicts an embodiment of the affinity adapter system 100, including at least a host 150 and data storage device 152. The host 150 may contain at least one or more applications 156, one or more operating systems 158, one or more correlation algorithms 132, and one or more affinity tables 162. The data storage device 152 may contain one or more controllers 180, a DRAM Cache 182, and one or more SSDs 120. The one or more SSDs 120 may contain one or more controllers 166, a DRAM Cache 167, one or more flash translation layers 168, one or more units of NAND Memory 172, one or more valid page tables 174, one or more mapping tables 176, and one or more affinity tables 178. The host 150, data storage device 152, and SSD 120 may additionally contain components not shown in FIG. 1B. The host 150 and data storage device 152 may be connected by a bus 154 or any other component capable of transmitting or communicating data. In embodiments, the affinity table 178 of the SSD 120 may be synchronized 174 from the affinity table 162 of host 150.

Figure 1C:
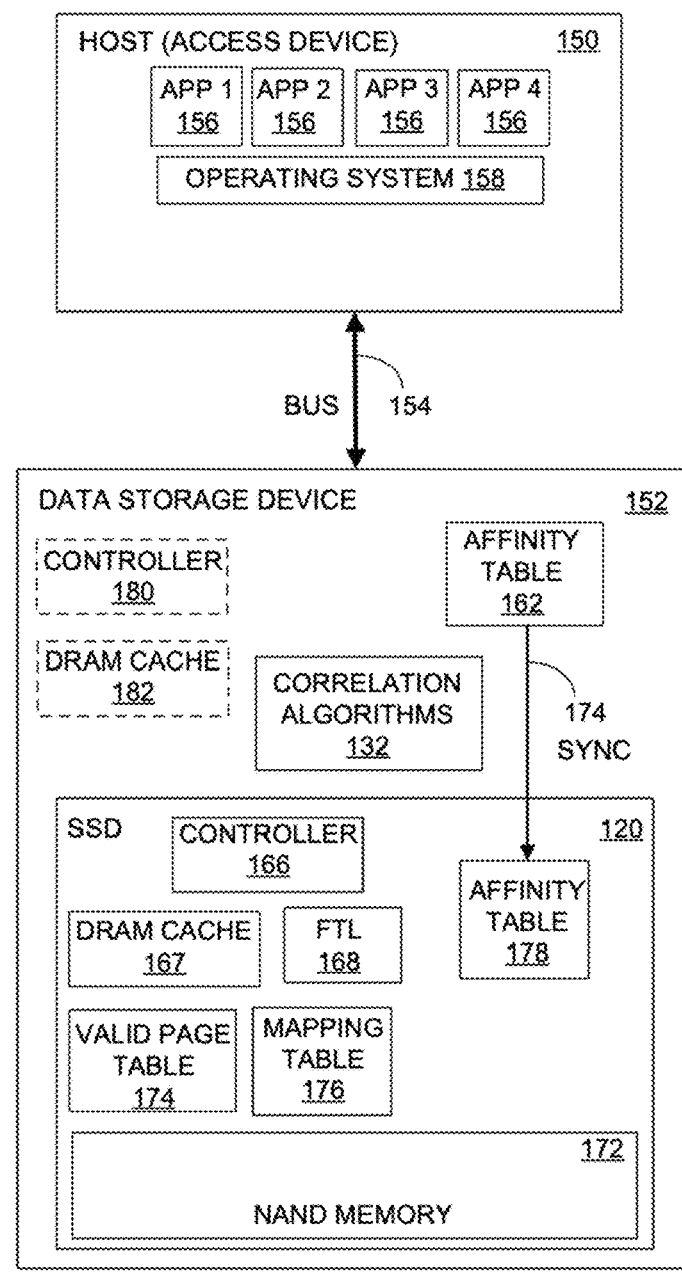
FIG. 1C depicts an example schematic diagram of an affinity adapter system wherein one or more correlation algorithms and an affinity table are located in a data storage device, in accordance with the example embodiments.

FIG. 1C depicts an embodiment of the affinity adapter system 100, including at least a host 150 and data storage device 152. The host 150 may contain one or more applications 156 and one or more operating systems 158. The data storage device 152 may contain one or more correlation algorithms 132, one or more affinity tables 162, one or more controllers 180, a DRAM Cache 182, and one or more SSDs 120. The one or more SSDs 120 may contain one or more controllers 166, a DRAM Cache 167, one or more flash translation layers (FTLs) 168, one or more units of NAND Memory 172, one or more valid page tables 174, one or more mapping tables 176, and one or more affinity tables 178. The host 150, data storage device 152, and SSD 120 may additionally contain components not shown in FIG. 1C. The host 150 and data storage device 152 may be connected by a bus 154 or any other component capable of transmitting or communicating data. In embodiments, the affinity table 178 of the SSD 120 may be synchronized 174 from the affinity table 162 of the data storage device 152.

Figure 2A:
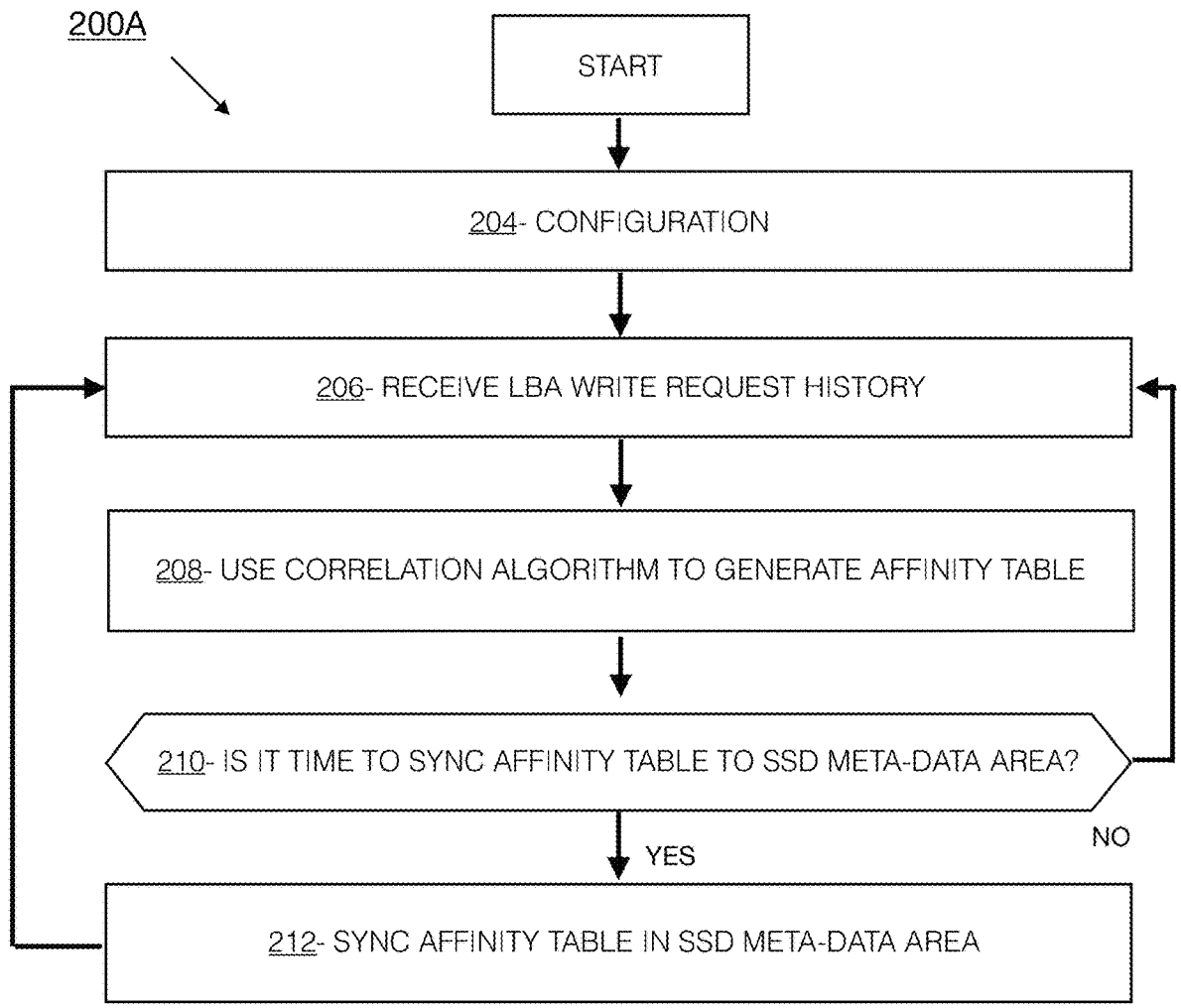
FIG. 2A depicts an example flowchart illustrating the operations of an affinity decision adapter in generating an affinity table and synchronizing the affinity table to the meta-data area of an SSD, in accordance with the example embodiments.

FIG. 2A depicts an example flowchart 200A illustrating the operations of the affinity decision adapter 134 of the affinity adapter system 100 in generating an affinity table and syncing 174 the affinity table to an SSD's meta-data area, in accordance with the example embodiments.

The affinity decision adapter 134 may receive a configuration (step 204). The affinity decision adapter 134 may be configured by receiving information such as a user registration and user preferences. The user registration and user preferences may be uploaded by a user and may be received by the affinity decision adapter 134 via the affinity decision client 122 and the network 108. In embodiments, receiving a user registration may involve receiving demographic information such as a name, username, a type of the solid-state drive 120, a serial number of the solid-state drive 120 and the like. In embodiments, the affinity decision adapter 134 may periodically collect LBA write request history and/or periodically sync 174 an affinity table in an SSD's meta-data area. The frequency of collecting LBA write request history and/or syncing 174 an affinity table in an SSD's meta-data area may be defined by a user preference. User preferences may additionally allow a user to choose or design a model of one or more correlation algorithms 132 and/or one or more formats of affinity decision samples for one or more applications. Additionally, in embodiments, user preferences may allow a user to choose or design a model of one or more correlation algorithms 132 and/or one or more formats of affinity decision samples for a specified time period. For example, a user may choose a first correlation algorithm to be used by the affinity decision adapter 134 every Monday and Thursday of every week, and a second correlation algorithm to be used by the affinity decision adapter 134 every Tuesday, Wednesday, Friday, Saturday, and Sunday of every week. Customizability of the user preferences may allow a user to add or update an algorithm for a legacy device that doesn't determine the affinity of data, or doesn't determine the affinity of data as accurately, providing flexibility and scalability without necessitating the alteration of an SSD's internal design. In embodiments, the affinity decision adapter 134 may apply for a small capacity (such as disk space) during configuration to maintain one or more affinity tables in an SSD's meta-data area.

To further illustrate the operations of the affinity decision adapter 134, reference is now made to an illustrative example where a user uploads a user registration with their name and type of solid-state drive 120 via the affinity decision client 122 and the network 108. The user also uploads a user preference for the affinity decision adapter 134 to collect LBA write request history on a specified periodic basis, e.g., once every second, and for the affinity decision adapter 134 to sync 174 the generated affinity table to the SSD's meta-data area on a specified periodic basis, e.g., once every three seconds.

Figure 4:
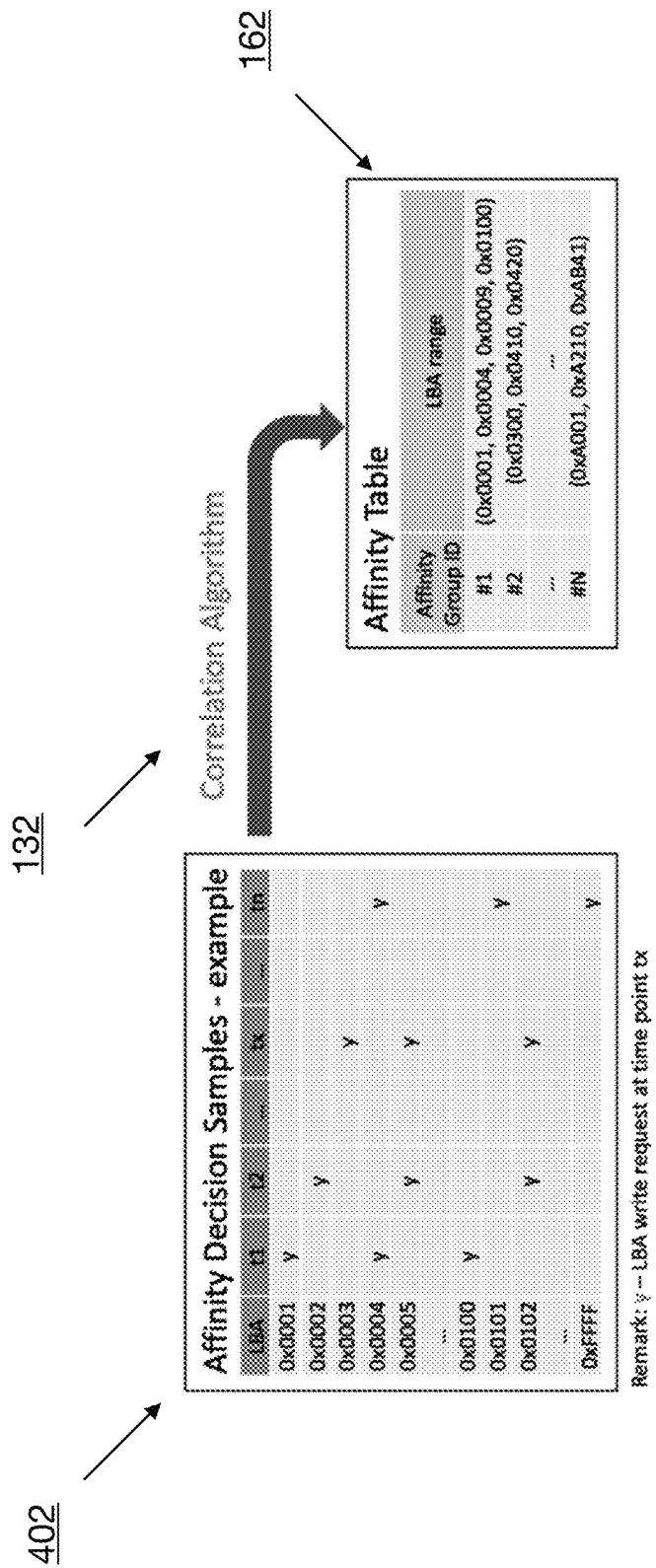
FIG. 4 depicts an illustrative example of the affinity decision adapter using LBA write request history in the form of affinity decision samples and a correlation algorithm to generate an affinity table, in accordance with the example embodiments.

The affinity decision adapter 134 may receive or collect SSD LBA write request history (step 206). In embodiments, the affinity decision adapter 134 may receive LBA write request history in any manner. LBA write request history may include information such as times of past write requests, and may be represented as timestamps aggregated in the form of a table. With reference to FIG. 4, received LBA write request history is depicted as affinity decision samples 402, and includes indications of the units of data that were written at given times. In embodiments, received or collected SSD LBA write request history may be received or collected at a rate or frequency determined by the user preferences in step 204. In embodiments, received or collected SSD LBA write request history may include additional information such as data types, data applications, data storage locations, etc. and may include any information relevant to the determination of data affinity.

With reference again to the previously introduced example where a user uploads a user registration and user preferences, and additionally with reference to FIG. 4, the affinity decision adapter 134 collects LBA write request history in the form of affinity decision samples 402 represented in a table.

The affinity decision adapter 134 may use the received LBA write request history and one or more correlation algorithms to generate an affinity table (step 208). The affinity decision adapter 134 may use training data along with various probabilistic context-free approaches to generate an affinity table 162 for the data of the SSD 120. In embodiments, the affinity decision adapter 134 may determine an affinity of one or more units of data or training data based on timestamps of past LBA write requests using various methods such as maximum entropy and neural nets methods. For example, and with reference to FIG. 4, the affinity decision adapter 134 may use a correlation algorithm 132 with a discrete maximum entropy approach to categorize data based on the software applications that utilize the different units of data. The affinity decision adapter 134 may use a correlation algorithm 132 that includes a model to weight time stamp data of past write requests such that timestamp groupings that are more indicative of data of a same affinity are weighted more heavily than others, producing a confidence score value for each piece of data with regard to each known affinity. The affinity decision adapter 134 may then compare the confidence scores to a threshold value. The affinity decision adapter 134 may determine that if one or more confidence scores is above the threshold, the highest confidence score is indicative of the affinity of the data. The affinity decision adapter 134 may determine that if none of the confidence scores is above the threshold, the data may belong to a new affinity. The threshold value may be configured differently for different purposes or applications. For example, an application that may benefit from a more precise and/or accurate approach in assigning affinities to units of data may utilize a higher threshold value, while an application that may benefit from fewer affinity types may utilize a lower threshold value.

Returning again to the previously introduced example where the affinity decision adapter 134 collects LBA write request history in the form of affinity decision samples 402 represented in the form of a table, and with reference to FIG. 4, the affinity decision adapter 134 uses the SSD's write request history in the form of affinity decision samples 402 and a correlation algorithm 132 to generate an affinity table 162 of the SSD's data with N affinities.

The affinity decision adapter 134 may determine an appropriate time to sync 174 the generated affinity table 162 to the SSD's meta-data area (decision 210). In embodiments, the affinity decision adapter 134 may compare the generated affinity table 162 to an affinity table 178 stored in the SSD's meta-data area for differences. The affinity decision adapter 134 may determine that any differences between the generated affinity table 162 and the affinity table 178 stored in the SSD's meta-data area indicate an appropriate time to sync 174 the generated affinity table 162 to the SSD's meta-data area. In embodiments, the affinity decision adapter 134 may sync the affinity table 162 to the affinity table 178 in client/server mode, and may reserve an area in the SSD 120's meta-data area for the syncing process. In embodiments, the appropriate one or more times to sync 174 the one or more generated affinity tables 162 may be determined by user preferences uploaded in step 204.

With reference again to the previously introduced example where the affinity decision adapter 134 uses the SSD's write request history in the form of affinity decision samples 402 and a correlation algorithm 132 to generate an affinity table 162 of the SSD's data, the affinity decision adapter 134 determines that after three seconds have passed, it is an appropriate time to sync 174 the generated affinity table 162 to the SSD's meta-data area, according to the previously uploaded user preferences.

If it is an appropriate time to sync 174 the generated affinity table 162 to the SSD's meta-data area (decision 210, "YES" branch), the affinity decision adapter 134 may synchronize 174 the generated affinity table 162 to the SSD's meta-data area (step 212). In embodiments, the affinity decision adapter 134 may synchronize 174 the generated affinity table 162 by erasing an affinity table 178 stored in the SSD's meta-data area and writing the generated affinity table 162 to the erased affinity table's 178 location. In other embodiments, the affinity decision adapter 134 may synchronize 174 the generated affinity table 162 by overwriting an affinity table 178 stored in the SSD's meta-data area with the generated affinity table 162. In embodiments where the SSD's meta-data area does not contain an affinity table 178, the affinity decision adapter 134 may synchronize 174 the generated affinity table 162 by writing, saving, and/or storing the generated affinity table 162 to one or more specified locations in the SSD's meta-data area. In yet other embodiments, the affinity decision adapter 134 may simply synchronize 174 the generated affinity table 162 to a free location in the SSD's meta-data area. In some embodiments, after syncing 174 the generated affinity table 162 to the SSD's meta-data area, the affinity decision adapter 134 may receive LBA write request history, use a correlation algorithm 132 to generate an updated affinity table 162, and determine an appropriate time to sync 174 the updated affinity table 162 to the SSD's meta-data area.

Figure 5:
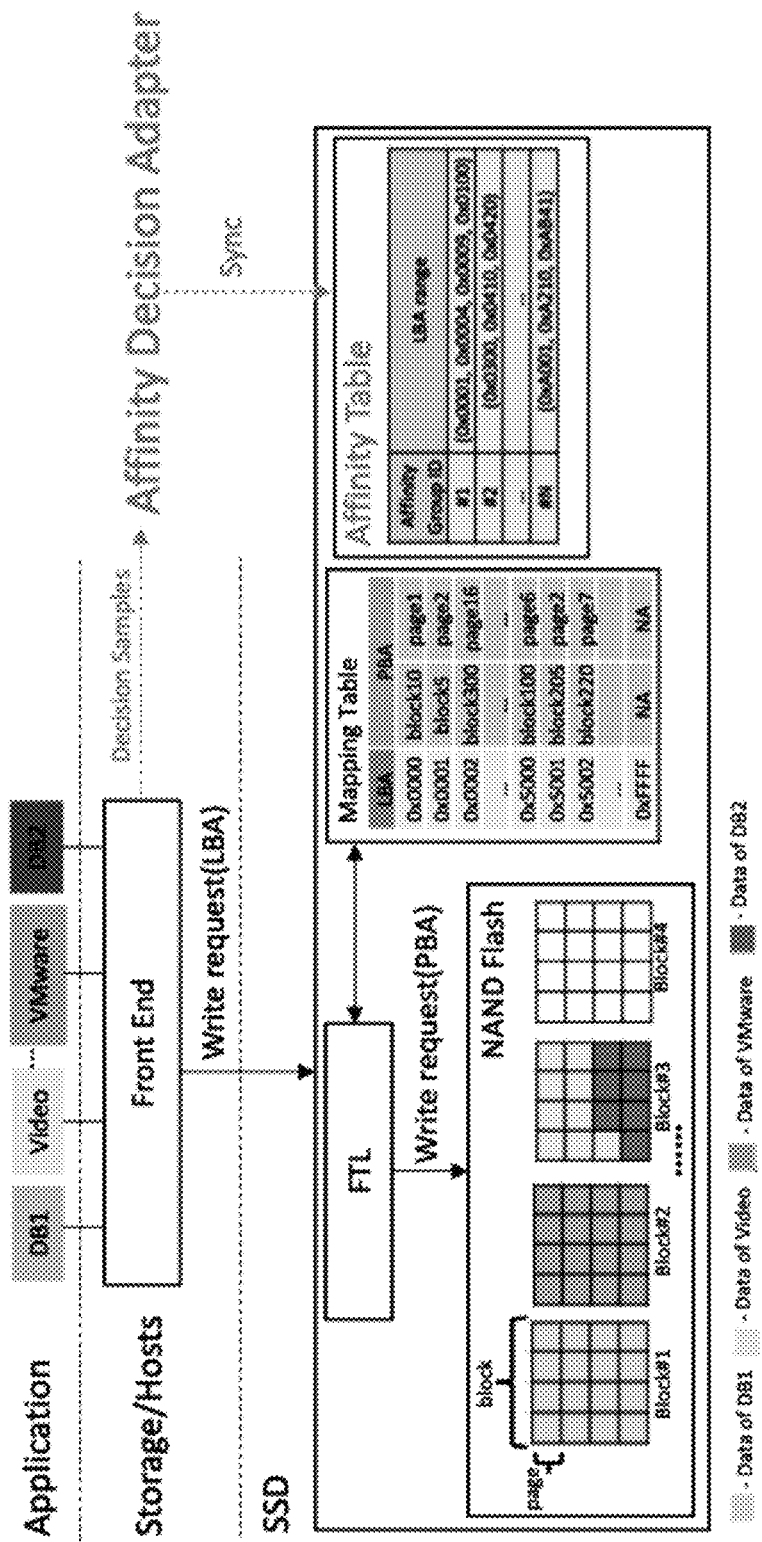
FIGS. 5-6 depict an illustrative example of the affinity decision adapter 134 synchronizing an affinity table to an SSD 120, in accordance with the example embodiments.
Figure 6:
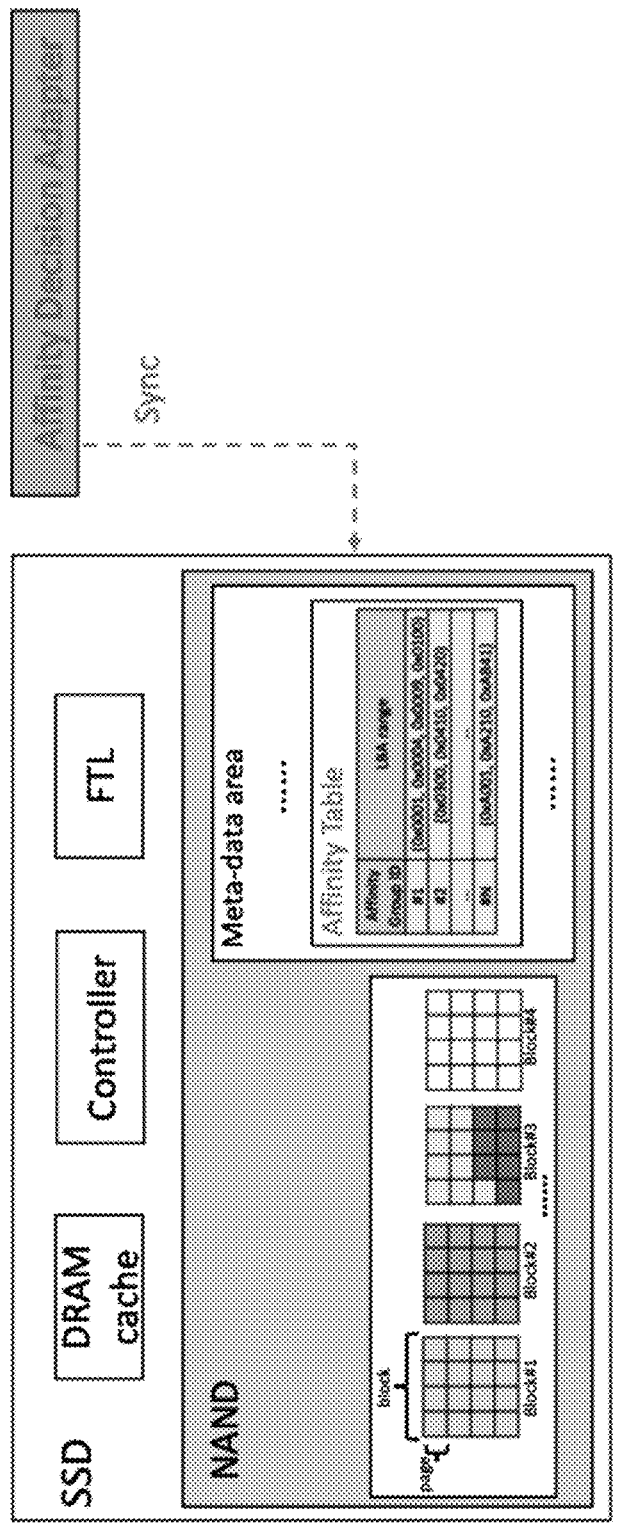

Returning again to the previously introduced example where the affinity decision adapter 134 determined that after three seconds had passed, it was an appropriate time to sync 174 the generated affinity table 162 to the SSD's meta-data area, and additionally with reference to FIG. 5-6, the affinity decision adapter 134 syncs 174 the generated affinity table 162 to the SSD's meta-data area by overwriting a previously stored affinity table 178.

If it is not an appropriate time to sync 174 the generated affinity table 162 to the SSD's meta-data area (decision 210, "NO" branch), the affinity decision adapter 134 may receive LBA write request history. In embodiments, the affinity decision adapter 134 may determine that if the generated affinity table 162 is identical to the affinity table 178 stored in the SSD's meta-data area, the SSD's 120 performance has previously been improved and remains currently improved. In some embodiments, the affinity decision adapter 134 may continue to receive LBA write request history, use one or more correlation algorithms 132 to generate an updated affinity table 162, and decide whether the updated affinity table 162 is identical to the affinity table 178 stored in the SSD's meta-data area until the affinity decision adapter 134 determines that the updated affinity table 162 is not identical to the affinity table 178 stored in the SSD's meta-data area. Rather than syncing the generated affinity table on a periodic basis, the generated affinity table may be synced when it is determined that the updated affinity table 162 is not identical to the stored affinity table 178. In other embodiments, the affinity decision adapter 134 may continue to receive LBA write request history and use one or more correlation algorithms 132 to generate an updated affinity table 162 until it is an appropriate time to sync 174 the generated affinity table 162 to the SSD's meta-data area as dictated by uploaded user preferences in step 204.

Figure 2B:
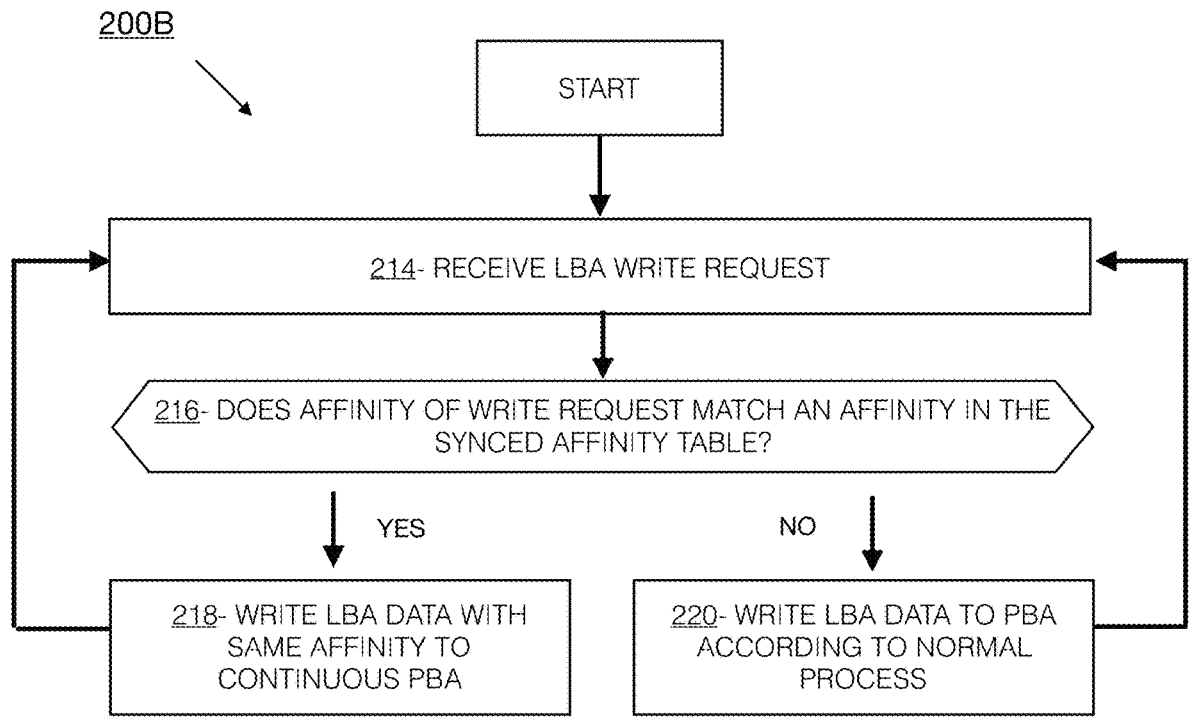
FIG. 2B depicts an example flowchart illustrating the operations of an affinity decision adapter in writing data to an SSD, in accordance with the example embodiments.

FIG. 2B depicts an example flowchart 200B illustrating the operations of the affinity decision adapter 134 of the affinity adapter system 100 in writing data to an SSD 120 after an affinity table 162 has been initially stored or subsequently synced 174 to affinity table 178 of the SSD 120, in accordance with the example embodiments.

The affinity decision adapter 134 may receive one or more LBA write requests (step 214). In embodiments, the affinity decision adapter 134 may receive an LBA write request in any manner. In various embodiments, an LBA write request may be received from an access device, such as host 150. In various embodiments, an LBA write request may be made by the flash translation layer 168 of an SSD 120 and may include a request to write a unit of data to the SSD's NAND Memory 172.

To further illustrate the operations of the affinity decision adapter 134, reference is now made to an illustrative example where an affinity decision adapter 134 receives an LBA write request for a page of data 0x0100 to be written to the SSD's NAND Memory 172.

The affinity decision adapter 134 may analyze the synced 174 affinity table 178, SSD DRAM cache 167, and/or SSD garbage collection valid page tables 174 to determine whether it has an affinity matching one of the affinities listed in the synced 174 affinity table 178 (decision 216). In embodiments, the affinity decision adapter 134 may compare the LBA of the write request with LBAs in the synced 174 affinity table 178 to determine the affinity of the write request LBA data. In embodiments, the affinity decision adapter 134 may compare the LBA of the write request with affinities of LBAs in the SSD's DRAM cache 167. In embodiments, when performing a garbage collection process, the affinity decision adapter 134 may compare the LBA of the write request of a valid page to be moved to another block with affinities of LBAs in the SSD's pool of garbage collection valid page tables 174, the synced 174 affinity table 178, or both tables 174 and 178.

With reference again to the previously introduced example where the affinity decision adapter 134 receives an LBA write request for a page of data 0x0100 to be written to the SSD's NAND Memory 172, the affinity decision adapter 134 uses the synced affinity table 178 to determine that the page of data 0x0100 has affinity #1. The affinity decision adapter 134 determines that there are LBAs in the SSD's DRAM cache 167 with affinity #1, and determines that there is a match.

If the affinity of the LBA data of the write request matches an affinity in the synced 174 affinity table 178 (decision 216, "YES" branch), the affinity decision adapter 134 may write the LBA data of the write request with the same affinity to a location of the SSD's continuous PBA (step 218). The affinity decision adapter 134 may write the LBA data of the write request to a location adjacent to one or more locations of LBA data of the same affinity, in the SSD's continuous PBA. In embodiments, one or more blocks of an SSD's NAND Memory 172 may each contain data of one affinity. In other embodiments, one or more blocks of an SSD's NAND Memory 172 may each contain data of two or more affinities. See FIG. 5, for example. In yet other embodiments, the writing of the LBA data of the write request to the SSD's continuous PBA may be configured alternatively. In embodiments, after writing the LBA data of the write request to the SSD's NAND Memory 172, the affinity decision adapter 134 may receive an additional LBA write request. In other embodiments, the affinity decision adapter 134 may pause or cease to run until another LBA write request is received.

Returning again to the previously introduced example where the affinity decision adapter 134 determines that there are LBAs in the SSD's DRAM cache 167 with affinity #1, and determines that there is a match, the affinity decision adapter 134 writes the LBA data of the write request to Block #1 of the SSD's NAND Memory 172, which solely contains LBA data of affinity #1.

If the affinity of the LBA data of the write request does not match an affinity in the synced 174 affinity table 178 (decision 216, "NO" branch), the affinity decision adapter 134 may write the LBA data of the write request to a location of the SSD's NAND Memory 172 according to a normal process, or any process known in the art (step 220). In embodiments, the affinity decision adapter 134 may simply write the LBA data of the write request to any unoccupied page of a block in the SSD's NAND Memory 172. In other embodiments, the affinity decision adapter 134 may write the LBA data of the write request in a different manner or to a different location. In embodiments, after writing the LBA data of the write request to the SSD's NAND Memory 172, the affinity decision adapter 134 may receive an additional LBA write request. In other embodiments, the affinity decision adapter 134 may cease to run.

FIG. 3 depicts an illustrative example of a garbage collection practice, in accordance with the example embodiments. After a period of operations, particular pages in a block will have been marked as invalid while other pages of the block will contain valid data. Because a block can only be erased in its entirety, there is a need to copy the valid pages to another block before performing an erase operation. In step 302, the pages marked with an X in blocks #1-#3 are invalid pages. Block #4 is an empty (destination) block. In step 304, the data of Block #1 not designated with an X, i.e., valid pages, has been copied and/or transferred to Block #4, and then the data of Block #1 has been subsequently erased. The garbage collection process described by steps 302 and 304 may be repeated with respect to Block #2-3 to delete the data designated by Xs on Block #2-3. While only one destination block is shown in FIG. 3, it should be appreciated that there may be a plurality of destination blocks, each of which may store data having various affinities. The process 200B may be employed to determine which destination block to write a valid page to.

FIG. 4 depicts an illustrative example of the affinity decision adapter 134 using LBA write request history in the form of affinity decision samples 402 obtained at various times and a correlation algorithm 132 to generate an affinity table 162 that groups particular LBA ranges into affinity groups, in accordance with the example embodiments.

FIG. 5-6 depict an illustrative example of the affinity decision adapter 134 synchronizing 174 an affinity table 162 to an affinity table 178 of an SSD 120, in accordance with the example embodiments.

Figure 7:
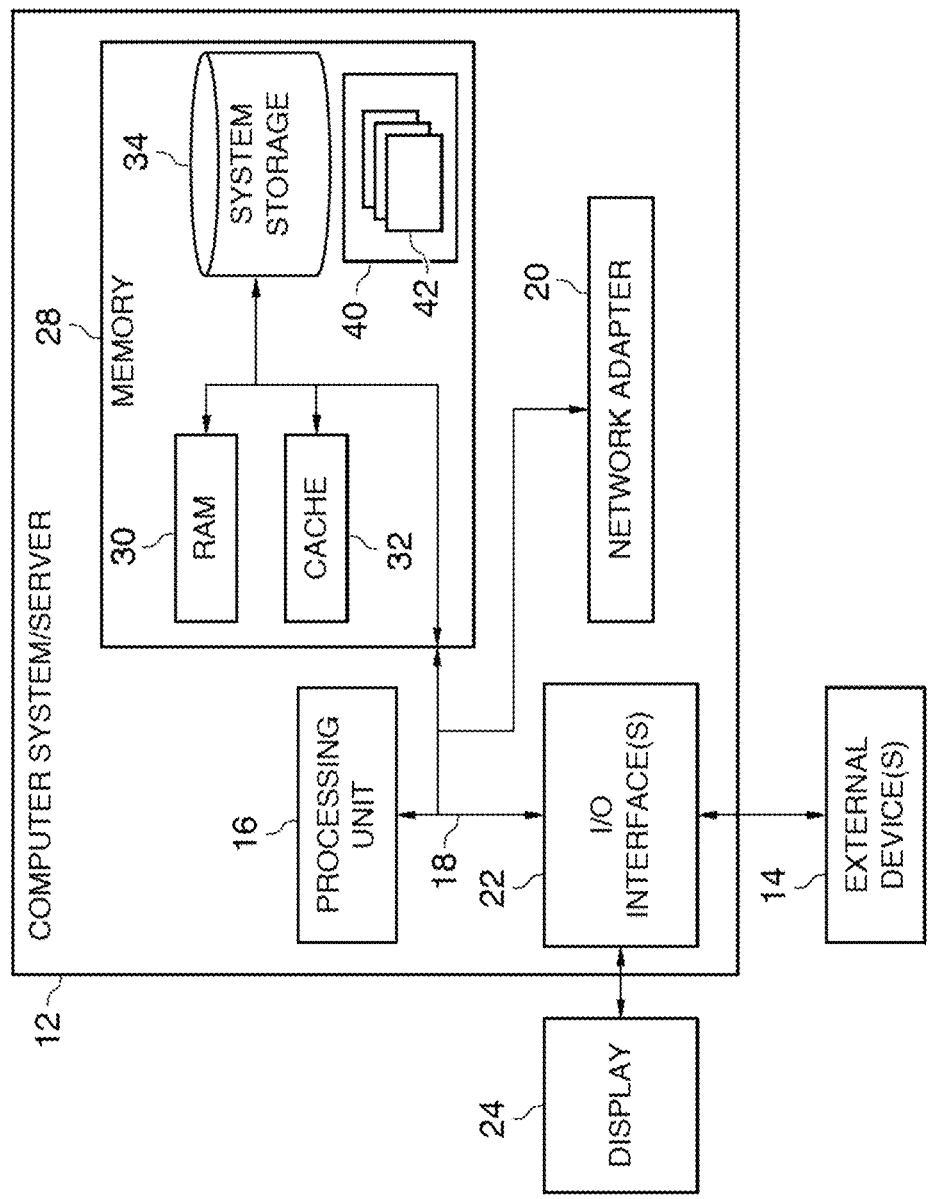
FIG. 7 depicts an example block diagram depicting the hardware components of the affinity adapter system of FIG. 1A, in accordance with the example embodiments.

FIG. 7 depicts a block diagram of devices within the affinity decision adapter 134 of FIG. 1A, in accordance with the example embodiments. It should be appreciated that FIG. 7 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the example embodiments. However, it should be appreciated that any particular program nomenclature herein is used merely for convenience, and thus the example embodiments should not be limited to use solely in any specific application identified and/or implied by such nomenclature.

Based on the foregoing, a computer system, method, and computer program product have been disclosed. However, numerous modifications and substitutions can be made without deviating from the scope of the example embodiments. Therefore, the example embodiments have been disclosed by way of example and not limitation.

It is to be understood that although this disclosure includes a detailed description on cloud computing, implementation of the teachings recited herein are not limited to a cloud computing environment. Rather, the example embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
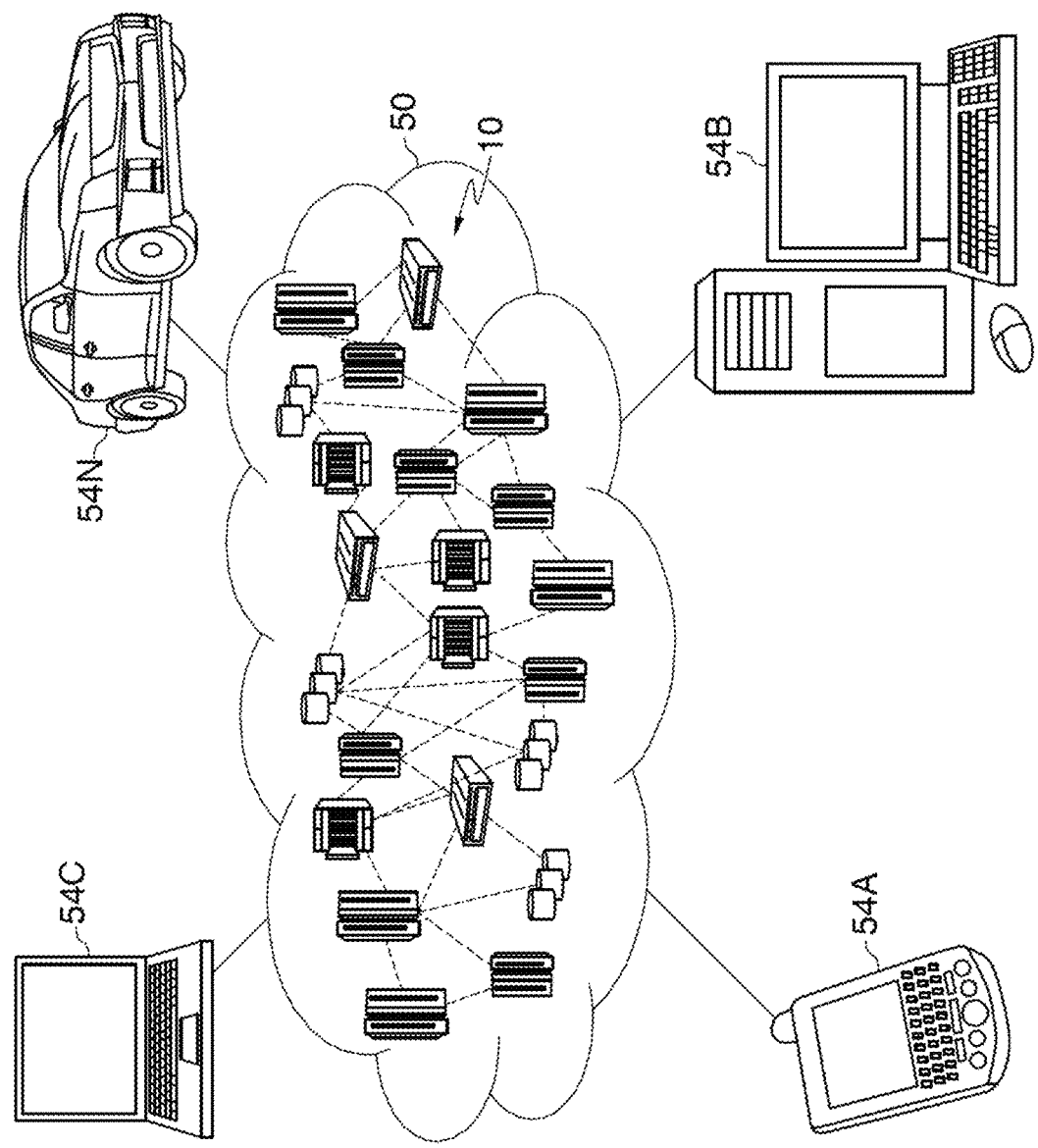
FIG. 8 depicts a cloud computing environment, in accordance with the example embodiments.

Referring now to FIG. 8, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 40 and cloud computing environment 50 can communicate with any type of computerized device over any type of network and/or network addressable connection (e.g., using a web browser).

Figure 9:
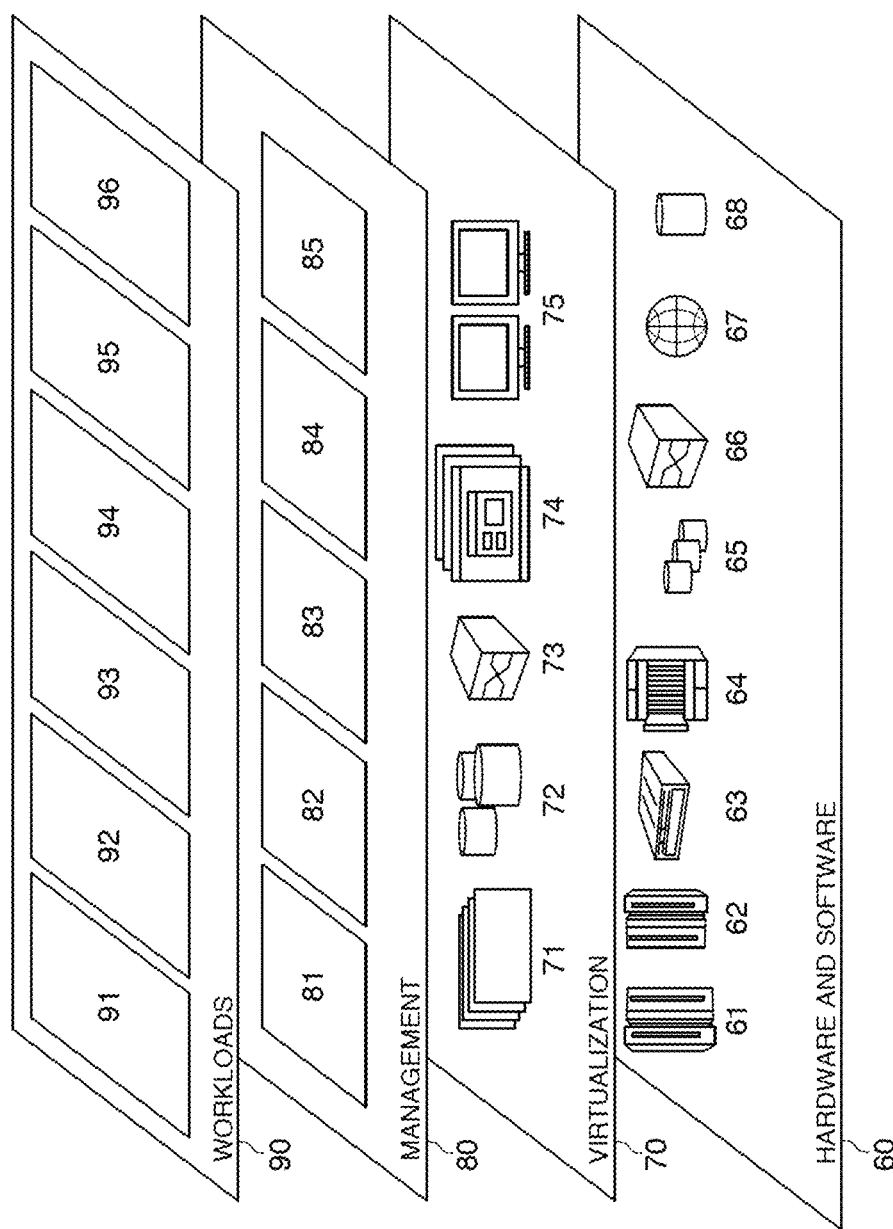
FIG. 9 depicts abstraction model layers, in accordance with the example embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and the example embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and solid-state drive performance improvement 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for improving solid-state drive performance, the method comprising:
   receiving, by a machine learning correlation algorithm, past logical block address write requests;
   generating an affinity table using the received machine learning correlation algorithm and the past logical block address write requests;
   syncing the generated affinity table to a meta-data area of a solid-state drive based on determining differences between the generated affinity table and a stored affinity table in the solid-state drive;
   generating, by an affinity adapter located external to the solid-state drive, a plurality of affinities for each of a plurality of data to a respective plurality of subdivisions of data of the solid-state drive, wherein the plurality of affinities is generated by the machine learning correlation algorithm, wherein each of the plurality of data is associated with a logical block address (LBA) and each of the respective plurality of subdivisions has a physical block address (PBA);
   receiving a request to write first data having a first LBA to the solid-state drive;
   determining by the solid-state drive, at a first time, that the first data has an affinity with a particular subdivision of data of a solid-state drive based on the generated plurality of affinities; and
   writing the first data to a memory location of the solid-state drive, wherein the PBA of the memory location has the determined affinity.

2. The method of claim 1, wherein generating the affinity for each of the plurality of data to the respective plurality of subdivisions of data of a solid-state drive further comprises receiving a plurality of past write requests of the solid-state drive.

3. The method of claim 1, further comprising storing the generated plurality of affinities in one or more affinity tables.

4. The method of claim 1, wherein the received request to write first data having a first LBA to the solid-state drive is generated by a garbage collection process.

5. The method of claim 2, wherein the plurality of past write requests of the solid-state drive are received over a first time period.

6. The method of claim 5, further comprising determining, at a second time subsequent to the first time, that the first data does not have an affinity with the particular subdivision of data of a solid-state drive, wherein the determining that the first data does not have an affinity with the particular subdivision of data of a solid-state drive is based on a second generation of a plurality of affinities.

7. The method of claim 1, wherein each subdivision of the solid-state drive's memory contains data of no more than one affinity.

8. A computer program product for improving solid-state drive performance, the computer program product comprising:
   one or more non-transitory computer-readable storage media and program instructions stored on the one or more non-transitory computer-readable storage media capable of performing a method, the method comprising:
   receiving, by a machine learning correlation algorithm, past logical block address write requests;
   generating an affinity table using the received machine learning correlation algorithm and the past logical block address write requests;

syncing the generated affinity table to a meta-data area of a solid-state drive based on determining differences between the generated affinity table and a stored affinity table in the solid-state drive;

generating, by an affinity adapter located external to the solid-state drive, a plurality of affinities for each of a plurality of data to a respective plurality of subdivisions of data of the solid-state drive, wherein the plurality of affinities is generated by the machine learning correlation algorithm, wherein each of the plurality of data is associated with a logical block address (LBA) and each of the respective plurality of subdivisions has a physical block address (PBA);

receiving a request to write first data having a first LBA to the solid-state drive;

determining by the solid-state drive, at a first time, that the first data has an affinity with a particular subdivision of data of a solid-state drive based on the generated plurality of affinities; and writing the first data to a memory location of the solid-state drive, wherein the PBA of the memory location has the determined affinity.

9. The computer program product of claim 8, wherein generating the affinity for each of the plurality of data to the respective plurality of subdivisions of data of a solid-state drive further comprises receiving a plurality of past write requests of the solid-state drive.

10. The computer program product of claim 8, further comprising storing the generated plurality of affinities in one or more affinity tables.

11. The computer program product of claim 8, wherein the received request to write first data having a first LBA to the solid-state drive is generated by a garbage collection process.

12. The computer program product of claim 9, wherein the plurality of past write requests of the solid-state drive are received over a first time period.

13. The computer program product of claim 12, further comprising determining, at a second time subsequent to the first time, that the first data does not have an affinity with the particular subdivision of data of a solid-state drive, wherein the determining that the first data does not have an affinity with the particular subdivision of data of a solid-state drive is based on a second generation of a plurality of affinities.

14. The computer program product of claim 8, wherein the affinity of one or more units of data is determined using one or more methods from the group comprising maximum entropy methods and neural net methods.

15. A computer system for improving solid-state drive performance, the computer system comprising:
one or more computer processors, one or more non-transitory computer-readable storage media, and program instructions stored on the one or more non-transitory computer-readable storage media for execution by at least one of the one or more processors capable of performing a method, the method comprising:

receiving, by a machine learning correlation algorithm, past logical block address write requests;

generating an affinity table using the received machine learning correlation algorithm and the past logical block address write requests;

syncing the generated affinity table to a meta-data area of a solid-state drive based on determining differences between the generated affinity table and a stored affinity table in the solid-state drive;

generating, by an affinity adapter located external to the solid-state drive, a plurality of affinities for each of a plurality of data to a respective plurality of subdivisions of data of the solid-state drive, wherein the plurality of affinities is generated by the machine learning correlation algorithm, wherein each of the plurality of data is associated with a logical block address (LBA) and each of the respective plurality of subdivisions has a physical block address (PBA);

receiving a request to write first data having a first LBA to the solid-state drive;

determining by the solid-state drive, at a first time, that the first data has an affinity with a particular subdivision of data of a solid-state drive based on the generated plurality of affinities; and writing the first data to a memory location of the solid-state drive, wherein the PBA of the memory location has the determined affinity.

16. The computer system of claim 15, wherein generating the affinity for each of the plurality of data to the respective plurality of subdivisions of data of a solid-state drive further comprises receiving a plurality of past write requests of the solid-state drive.

17. The computer system of claim 15, further comprising storing the generated plurality of affinities in one or more affinity tables.

18. The computer system of claim 15, wherein the received request to write first data having a first LBA to the solid-state drive is generated by a garbage collection process.

19. The computer system of claim 16, wherein the plurality of past write requests of the solid-state drive are received over a first time period.

20. The computer system of claim 19, further comprising determining, at a second time subsequent to the first time, that the first data does not have an affinity with the particular subdivision of data of a solid-state drive, wherein the determining that the first data does not have an affinity with the particular subdivision of data of a solid-state drive is based on a second generation of a plurality of affinities.

* * * * *